UNITED STATES PATENT OFFICE.

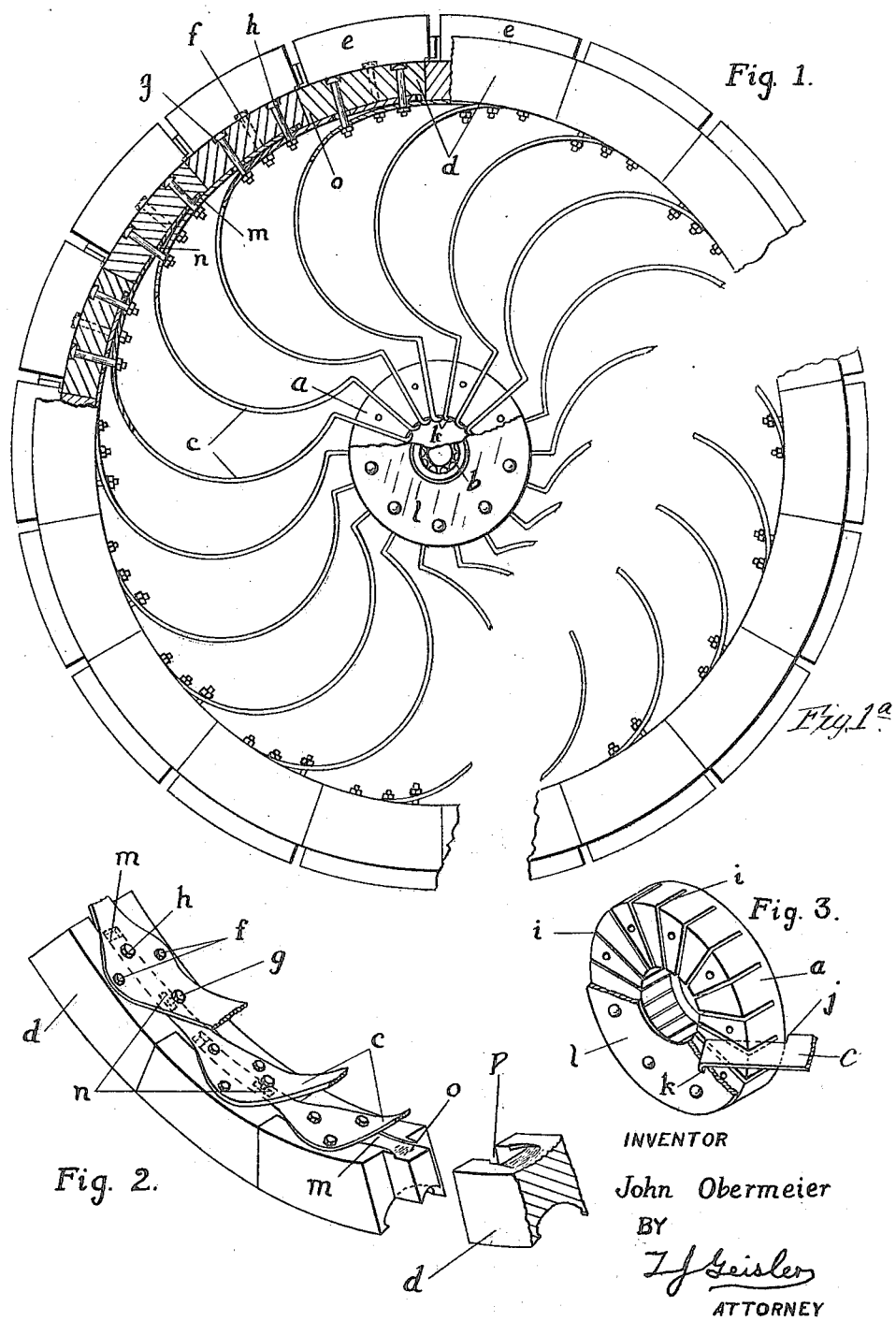

JOHN OBERMEIER, OF PORTLAND, OREGON.

ELASTIC VEHICLE-WHEEL.

1,213,774.　　　　　　Specification of Letters Patent.　　Patented Jan. 23, 1917.

Application filed August 30, 1916.　Serial No. 117,783.

*To all whom it may concern:*

Be it known that I, JOHN OBERMEIER, a citizen of the United States, and a resident of Portland, county of Multnomah, State of Oregon, have invented a new and useful Improvement in Elastic Vehicle-Wheels, of which the following is a specification.

This invention relates to vehicle wheels, and has for its purpose to provide a type of wheel, especially for automobiles, auto-trucks, and other vehicles of rapid conveyance, which will furnish a degree of resiliency to the axle and trucks, and thus decrease the shocks ordinarily sustained by these parts when the vehicle travels over rough roadways. It is a well known fact that, while the body of the vehicle, being set on springs, is considerably relieved of the detrimental impact incurred by the vehicle bumping over the ruts and depressions of rough roads, the truck members receive little or no relief whatever from these shocks. Moreover, since the trucks, axles, and wheels of a vehicle generally comprise considerable mass, the force developed by the trucks jumping from one depression to another produces a pounding which is extremely deteriorating upon the road itself, and a large amount of heavy traffic on ordinary macadam or earth roads necessitates a constant and considerable expense in the maintenance and repairs of the latter, or else the same will be rendered practically unusable within a very short period of time.

I am aware that the broad idea of spring wheels is not new, but my invention is designed to eliminate the undesirable feature of the spring wheels heretofore existing, of which I have knowledge. In short, by my invention I have devised a type of wheel especially light in weight, simple in construction, and at the same time one of sufficient strength and durability to withstand the severe strains to which it is subjected. Furthermore, my improved spring wheel is adapted for any class of vehicle; it is also adapted to be adjusted to vary the resiliency, and suit the same to the service for which it is to be used. My improved wheel, moreover, is especially designed to be converted either into a wheel having a substantial solid rim and tire, or into a wheel having its rim and tire formed of relatively yielding segments or sections, which may be preferred for lighter vehicles, as such a rim has a tendency to make the vehicle easier riding.

The features of my invention are best understood by referring to the accompanying drawings, in which; Figure 1, is a side view, partly in section, of a portion of my improved wheel, showing the rim thereof in its less resilient state; Fig. 1ª is a side view of a portion of my wheel showing my improved sectional rim with certain of the spoke-fastening bolts removed to permit a greater resiliency of the wheel; Fig. 2, is a perspective view of a portion of my sectional rim, showing the manner of fastening the outer ends of the spokes thereto; Fig. 3, is a perspective view of the hub of my wheel, showing the inner end of one of the spring spokes slightly out of place.

Referring to Fig. 1, *a* represents the hub of my wheel, adapted to be used with any standard auxiliary bearing *b*. *c* represents spring spokes preferably of the particular form shown; *d* represents the rim, and *e* the tire of my wheel; *f*, *g*, and *h* are bolts for fastening the outer ends of the spokes firmly to the rim.

The hub of my wheel, as shown in Fig. 3, is provided with radial slots *i*, cut through one face of the hub for receiving the inner ends of the spokes *c*. To keep the spokes *c* firmly in place in the hub, I provide the former with the shoulder *j*, and hook end *k*, which bear firmly against the external and internal peripheries, respectively, of the hub. A plate 1, bolted against the face of the hub, locks the spokes firmly in place.

The rim *d* is ordinarily composed of a number of sections, corresponding to the number of the spring spokes used, as shown in Figs. 1 and 2. By this means a considerably higher degree of resiliency is obtained in the wheel. The ends of the rim sections are tongue and grooved together, so as to prevent any transverse displacement (shown by *o* and *p*, Fig. 2).

Each spoke extends along, and bears against, the inner periphery of two successive rim sections, and is secured rigidly to the first section by means of two bolts *f*. As the spoke extends along the rim it becomes seated in the beveled groove *m*. This portion of the spoke also extends along under the rim-abutting portion of the adjacent spoke, as shown in Figs. 1 and 2. By this construction the rim sections are firmly held against displacement. The groove *m* extends slightly beyond the extremity of the spoke seated therein, for the purpose hereinafter described. To provide a means of tightening the springs when required, and keep the hub centered in the wheel, I provide bolts $g$, as shown in Figs. 1 and 2. The extremity of the spoke extending under the adjacent rim section is provided with slot $n$, in order that the spoke may be permitted some movement along this rim section by the bolt $g$. Such makes the vehicle easy riding. Although each spoke, as described, connects two successive rim sections, it need be secured rigidly to only the first section, in which case a greater resiliency will be given to the wheel. However, when this degree of resiliency is not required, but it is rather desired to have the wheel as strong as possible, then the ends of the spokes may be restrained against longitudinal movement by the insertion of the bolts $h$, thus providing substantially a solid integral rim for my wheel.

I find that for ordinary use, a hard rubber tire is sufficiently resilient when used with my spring wheel. This tire, if made in sections as indicated in Fig. 1, will furnish a higher degree of resiliency than a solid integral tire. A sectional tire should always be used when the lock bolts $h$ are omitted. When the rim sections are firmly tied together by the bolts $h$, and an integral tire placed around the wheel rim, the effect produced will be the same as if my wheel were made with an integral rim. A pneumatic tire may also be used on this type of wheel, but as it is one of the aims of my invention to produce a wheel supplying a sufficient degree of elasticity and resiliency in itself, the pneumatic tire can be dispensed with.

The condition of the rim as it is shown in the accompanying drawings is as follows: Bolts $f$ secure the outer end of each spoke firmly to a particular rim section. These bolts pass to the sides of the underlying tongue and by so doing do not affect the latter. The bolts $g$ pass through the spokes slightly in advance of the point of contact of the latter with the rim, and thus provide a means of putting a greater tension in the spokes and of centering the hub $a$ in the wheel. These bolts also serve as a stop for limiting the longitudinal movement of the underlying spoke end to the length of the slot $n$. The auxiliary bolts $h$ bind two successive spoke ends and a rim section firmly together. The bolts $h$ also bind each spoke tongue firmly to two adjoining rim sections, thus locking two adjacent rim sections together and producing the effect of a solid rim.

I claim:

1. A wheel comprising a hub, spring-spokes having a straight inner-end portion and a circular curve beyond such portion, means for securing said inner ends of the spokes to the hub, a section-rim, interlocking means on the abutting ends of said rim sections, adapted to permit the rim sections relative, independent, radial and longitudinal movement, the outer ends of said spokes being made to bear on the inner face of one rim-section and having a projecting tongue overlapping the inner face of the adjacent rim-section, the tongue of one spoke underlying the outer end of the adjacent spoke, bolts connecting the overlying outer-ends of the spokes to the rim, including adjustment bolts, adapted for drawing a greater or lesser portion of said outer ends to the rim, whereby the tension of the spokes may be adjusted and the hub centered.

2. A wheel comprising a hub, spring-spokes having a straight inner-end portion and a circular curve beyond such portion, means for securing said inner ends of the spokes to the hub, a section-rim, interlocking means on the abutting ends of said rim-sections, adapted to permit the rim-sections relative, independent, radial and longitudinal movement, the outer ends of said spokes being made to bear on the inner face of one rim-section, and having a projecting tongue overlapping the inner face of the adjacent rim-section, the rim sections being made with longitudinal grooves for said tongues of the spokes, the tongue of one spoke underlying the outer end of the adjacent spoke, bolts connecting the overlying outer-ends of the spokes to the rim, including adjustment bolts, adapted for drawing a greater or lesser portion of said outer ends to the rim, whereby the tension of the spokes may be adjusted and the hub centered.

3. A wheel comprising a hub, spring-spokes having a straight inner-end portion and a circular curve beyond such portion, means for securing said inner ends of the spokes to the hub, a section-rim, tongue and groove elements on the abutting ends of said rim-sections, adapted to permit the rim sections relative, independent, radial and longitudinal movement, the outer ends of said spokes being made to bear on the inner face of one rim-section and having a projecting tongue overlapping the inner face of the adjacent rim-section, the rim sections being made with longitudinal grooves for said tongues of the spokes, the tongue of one spoke underlying the outer end of the adjacent spoke, bolts connecting the overlying outer-ends of the spokes to the rim, including adjustment bolts, adapted for drawing a greater or lesser portion of said outer-ends to the rim, whereby the tension of the spokes may be adjusted and the hub centered.

4. A wheel comprising a hub, spring-spokes having a straight inner-end portion and a circular curve beyond such portion, means for securing said inner ends of the spokes to the hub, a rim, the outer ends of said spokes being made to bear on the inner face of the rim and having a projecting tongue, the tongue of one spoke underlying the outer end of the adjacent spoke, bolts connecting the overlying outer-ends of the spokes to the rim, including adjustment bolts, adapted for drawing a greater or lesser portion of said outer ends to the rim, whereby the tension of the spokes may be adjusted and the hub centered.

5. A wheel comprising a hub, spring-spokes having a straight inner-end portion and a circular curve beyond such portion, means for securing said inner ends of the spokes to the hub, a rim, the outer ends of said spokes being made to bear on the inner face of the rim, and having a projecting tongue, the tongue of one spoke underlying the outer end of the adjacent spoke, bolts connecting the overlying outer-ends of the spokes to the rim, including adjustment bolts, adapted for drawing a greater or lesser portion of said outer-ends to the rim, whereby the tension of the spokes may be adjusted and the hub centered, the underlying spoke ends being provided with a longitudinal slot through which said adjustment bolts extend, whereby said underlying spoke ends are permitted longitudinal movement under the overlying spoke members.

6. A wheel comprising a hub, spring-spokes having a straight inner-end portion and a circular curve beyond such portion, means for securing said inner ends of the spokes to the hub, a rim, the outer ends of said spokes being made to bear on the inner face of the rim, and having a projecting tongue, the tongue of one spoke underlying the outer end of the adjacent spoke, bolts connecting the overlying outer-ends of the spokes to the rim, including adjustment bolts, adapted for drawing a greater or lesser portion of said outer ends to the rim, whereby the tension of the spokes may be adjusted and the hub centered, auxiliary bolts securing the overlying ends, and the extremities of the tongue of the underlying ends, of the spokes together and to the rim.

JOHN OBERMEIER.

Copies of this patent may be obtained for five cents each, by addressing the "Commissioner of Patents, Washington, D. C."